INVENTOR
RAYMOND LE BRISE
BY [signature]
ATTY.

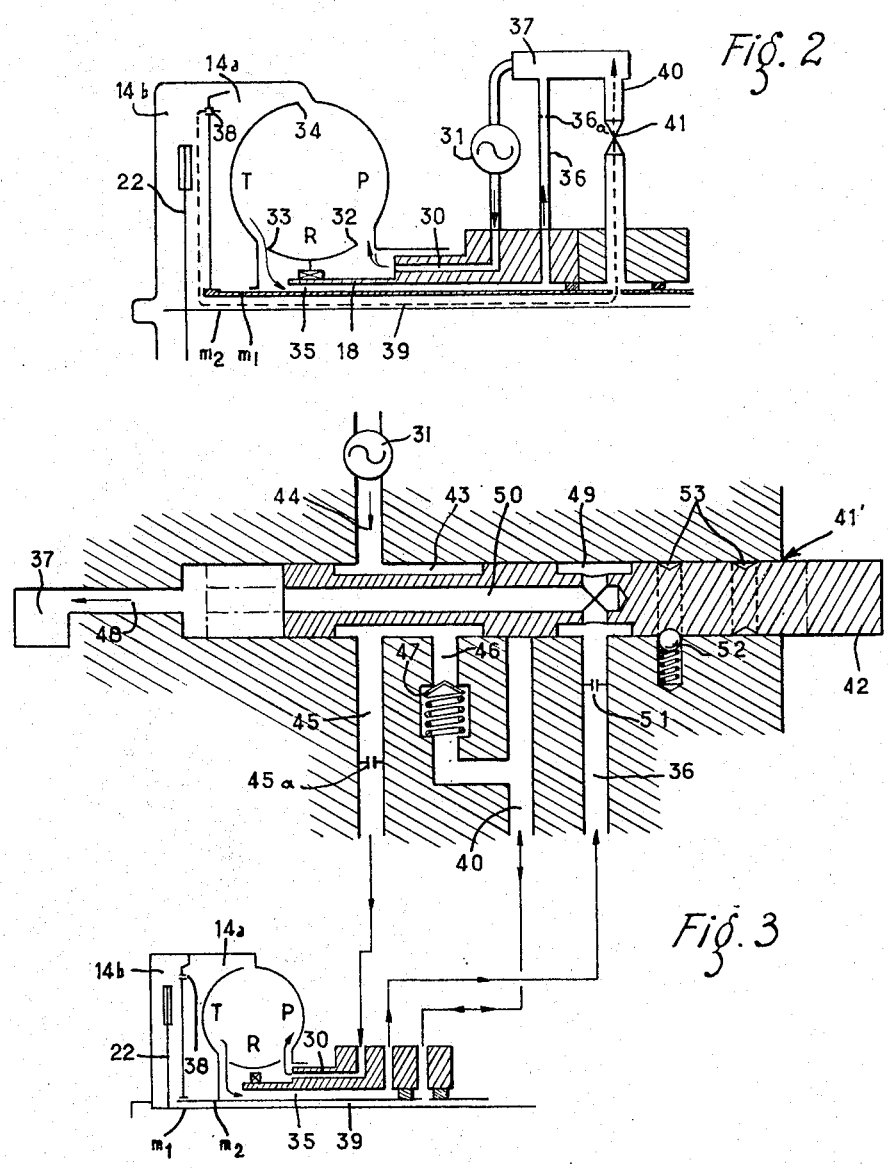

May 18, 1965

R. LE BRISE 3,184,019

HYDRAULIC COUPLING HAVING COMMUNICATING
CLUTCH AND PRESSURE CHAMBERS

Filed Sept. 29, 1960

INVENTOR
RAYMOND LE BRISE
BY Irwin D. Thompson
ATTY.

United States Patent Office 3,184,019
Patented May 18, 1965

3,184,019
HYDRAULIC COUPLING HAVING COMMUNICATING CLUTCH AND PRESSURE CHAMBERS
Raymond Le Brise, Saint-Denis, France, assignor to Societe Anonyme Francaise du Ferodo, Paris, France, a corporation of France
Filed Sept. 29, 1960, Ser. No. 59,432
Claims priority, application France, Oct. 5, 1959, 806,742, Patent 1,246,261; Nov. 30, 1959, 811,652
8 Claims. (Cl. 192—3.2)

The present invention relates to a transmission device comprising on the one hand a torque converter with at least one impeller element, a turbine element and a reactor device, and on the other hand a friction clutch hydraulically controlled with at least one axially-fixed supporting plate, an axially-movable pressure plate and a friction disc intended to be gripped between the two said plates, in which the driving shaft is coupled to the said impeller element, a first driven shaft is coupled to the said turbine element, and a second driven shaft is coupled to the said friction disc, the said plates being fixed for rotation with one of the said elements while the moving pressure plate forms a separation in the oil chamber of the device to constitute a first chamber which comprises the said friction disc and a second chamber which comprises the converter, the said pressure plate being movable under the effect of the thrusts which are developed in the two chambers and, depending on one thrust becoming preponderant with respect to the other or vice-versa, ensuring the disengagement or the engagement of the friction disc with the driving shaft.

In the transmission devices of the type indicated above, it has already been proposed to effect the disengagement and the engagement of the friction disc in the following manner. During the period of disengagement, the supply of oil to the converter is effected by an inlet opening into the friction disc chamber, the passage into the converter chamber being effected through nozzles or orifices provided with flap-valves opening towards the converter and being formed in the moving plate in the vicinity of its shaft, the disengagement being obtained by virtue of the difference of pressure on the faces of the moving plate due to the losses of pressure through the orifices.

During the period of engagement, the supply is effected in the vicinity of the shaft on the converter side, the engagement being produced by the pressure thus generated on the converter side which closes the flap-valves, while the friction disc chamber has been put into communication with an oil reservoir on the upstream side of a source of oil pressure. A device of this known kind operates correctly when the speeds of the turbine and the friction disc are not greatly different, this difference in speed being capable of increase with an increase in the supply pressure which is available, the pressure losses in the chambers being correspondingly greater. As the impeller speed increases and when the difference in speed thus reaches a certain threshold value, it is found that, although the circuit is then in the condition for disengagement, the friction disc can become engaged.

The applicant has sought to find the causes of this phenomenon and has discovered that it was due to the fact that the friction disc and converter turbine chambers, which have parts rotating in unison at the speed of the driving shaft, have also parts such as the said disc and the turbine which respectively rotate at different speeds and which, to a certain extent, impose their speed on the oil contained in these chambers. The dynamic pressures which result from this are therefore greater on the converter side than on the friction disc side. If the pressure drop across the nozzles, taking account of the various leakages and of the surface of the moving wall, is insufficient to overcome the opposing forces due to the differences in dynamic pressure, the engagement will be effected spontaneously and in an untimely manner above a certain speed.

The present invention has for its object a transmission device comprising a torque converter and a hydraulically-operated clutch which is free from the drawbacks referred to above and which operates perfectly, independently of the speed of rotation of the motor during the two phases of the control enabling the driver to remain in entire control of the operation under all conditions of use.

A device of the kind referred to is especially characterized, according to the invention, in that a communication between the two chambers is formed by at least one orifice, means being provided for obtaining a very small rate of flow through the said orifice in the direction from the converter chamber to the friction disc chamber, so as to cause disengagement, and a large rate of flow in the same direction in order to cause engagement.

Forms of embodiment of the invention are described below by way of example, reference being made to the accompanying drawings, in which:

FIG. 2 is a diagram of the hydraulic circuit of the said control;

FIG. 3 is an alternative form of the diagram incorporating a control distributor on a larger scale;

Figures 1, 1A:
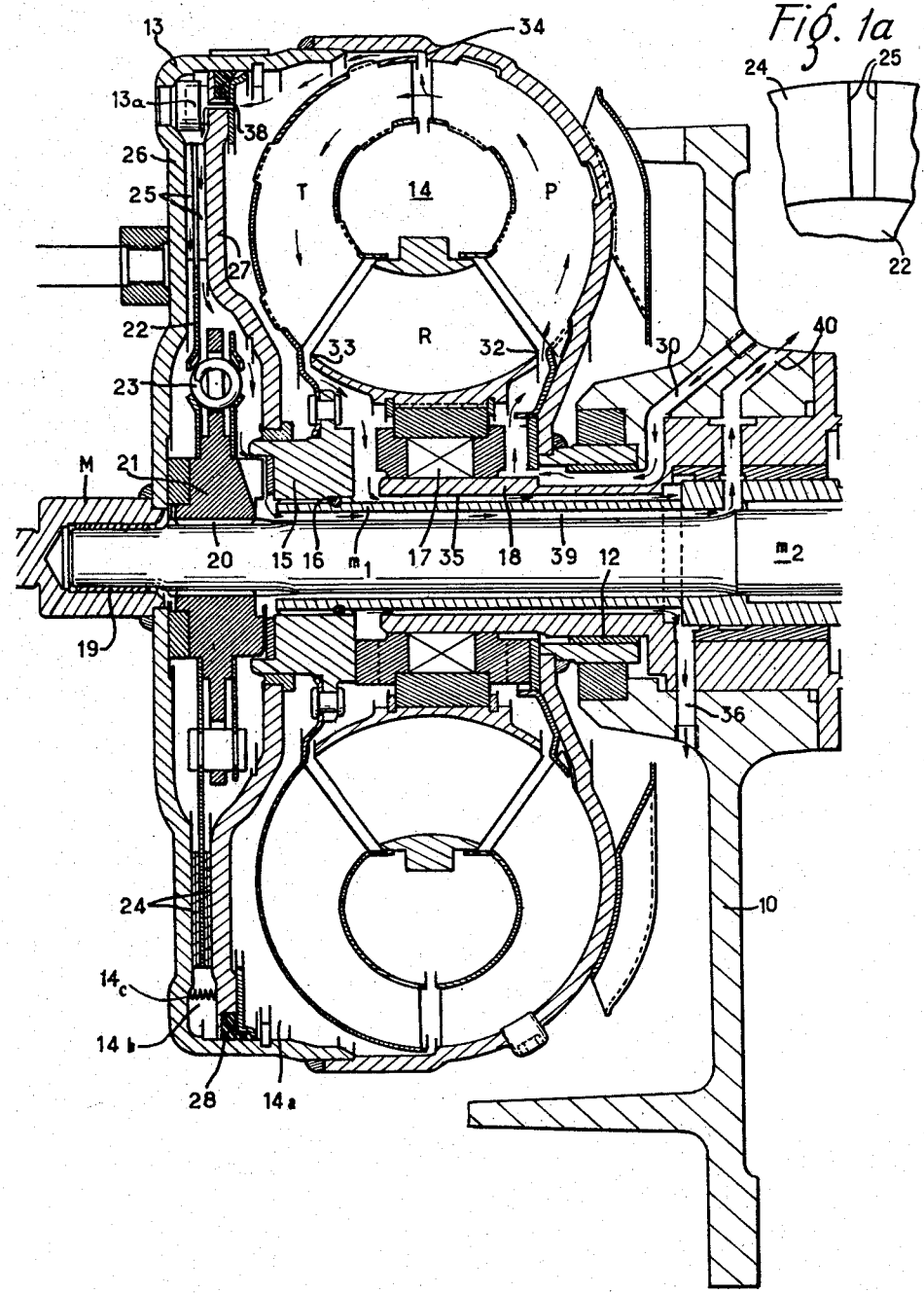
FIG. 1 is a view in longitudinal cross-section of a hydraulic torque converter provided with an auxiliary clutch control according to the invention.
FIG. 1a shows partially in elevation the grooved friction disc of the clutch.

Reference will first be made to FIG. 1, in which there is shown respectively the impeller or pump P, the turbine T, and the reactor R of the hydraulic torque converter.

The pump P, which is centered on the fixed casing 10 by a ring 12, is rigidly fixed to a bell 13. This bell forms, with the pump P, a fluid-tight oil chamber 14 surrounding the other elements, the turbine T and the reactor R of the converter, together with other members such as the disc 22 which are associated therewith and which will be described below in more detail.

The bell 13 is coupled to the pump P and is rigidly fixed to the driving shaft M of the transmission. The turbine T is carried by a hub 15 mounted on splines 16 on a first driven shaft $m_1$ of the transmission. The reactor R is coupled through the intermediary of a free-wheel 17 to a tubular body 18 which surrounds the shaft $m_1$ and which forms part of the fixed casing 10.

The first driven shaft $m_1$ is hollow and surrounds a second driven shaft $m_2$ which is centered at its end by a ring 19 in an orifice bored in the driving shaft M. The driven shaft $m_2$ carries a spline-mounted hub 21, the splines being shown at 20, coupled to a friction disc 22 through the intermediary of torsion-damping springs 23. The disc 22 is provided with peripheral friction linings 24 in which are formed grooves 25 (FIGS. 1 and 1a), and is intended to be gripped on the one hand between the bell 13 forming a supporting plate 26 and on the other hand a pressure plate 27. The plate 27 is mounted fast for rotation with the bell 13 by tenons and mortices 13a, a sliding joint 28 being provided for sealing purposes, and it surrounds the hub 15 which carries the turbine T. The plate 27 and the joint 28 divide the oil chamber 14 into two chambers, one pressure chamber 14a situated on the converter side and one clutch chamber 14b containing the disc 22.

The pressure plate 27 is axially movable along a small travel which is however sufficient to permit the release and the gripping of the disc 22 between the plates 26 and 27. Small disengagement springs 14c may be provided between the plates 26 and 27 to add their action to that of the pressure in the chamber 14b.

When the friction disc is freed between the plates 26 and 27, the transmission is driven through the intermediary of the torque converter, that is to say by the turbine T and the shaft $m_1$, while the shaft $m_2$, which is permanently coupled to the output end of the transmission rotates under no-load with the disc 22 at a speed less than that of the shaft $m_1$ and the turbine T. In other words, shaft $m_1$ can overrun shaft $m_2$, this latter rotating in the same or in the reverse direction of shaft $m_1$. The speed of shaft $m_2$ in the reverse direction can be higher than the speed of shaft $m_1$. This phase of operation corresponds to starting up in low gear. When the friction disc 22 is gripped between the plates 26 and 27, the shaft $m_1$ is disconnected from the output end of the transmission and rotates at the speed of the turbine T, and only the shaft $m_2$ is operative by directly coupling the driving shaft M with the output end. This phase corresponds to the maximum gear ratio.

A control is provided to ensure the transition from one phase of operation to the other and comprises an oil circuit passing through the chamber 14. This circuit is such that on the one hand the oil is generally renewed in the elements P, T and R in order to avoid overheating, this action being continuous or in any case while the converter P, T and R is working, and on the other hand in order to determine at will the relative conditions of pressure in the chamber 14a and the chamber 14b, in order that the plate 27, which is responsive to these conditions, definitely frees the disc 22 during the starting-up phase and grips it during the top gear phase in the manner provided.

The hydraulic control circuit (FIGS. 1 and 2) comprises a supply conduit 30 for oil under pressure, provided for example by the delivery of the oil pump 31 of the engine; the conduit 30 supplies the converter through a fluid inlet 32 formed between the reactor R and the pump P. The oil admitted at 32 into the converter has two parallel paths available for passing out of the converter, one path 33 which corresponds to the space formed between the turbine T and the reactor R, and the other 34 which corresponds to the space formed between the pump P and the turbine T. The outlet 33 supplies a passage 35 formed between the shaft $m_1$ and the body 18 and coupled at 36, across an appreciable pressure-drop shown diagrammatically by the diaphragm 36a, to the reservoir 37 of the circuit from which the pump 31 derives its intake. The other outlet 34 permits an admission of oil into the portion of the chamber 14a comprised between the turbine T and the plate 27, and thence through one or a number of small orifices or openings 38, preferably formed in the periphery of the plate 27, into the chamber 14b formed between the plates 26 and 27. From the chamber 14b, the oil proceeds through the intermediary of the grooves 25 to a passage 39 formed between the shafts $m_1$ and $m_2$ and coupled at 40 to the reservoir 37 through the intermediary of a valve 41 which constitutes the main member of the control.

When the valve 41 is closed, flow through orifices 38 and chamber 14b largely ceases. For this reason, the pressures in the two chambers balance each other at the periphery, and the resultant mean pressure in the chamber 14b is higher than that in the chamber 14a. The plate 27 is pushed towards the right-hand side of FIG. 1, and the disc 22 is disengaged. The first phase of operation in low gear is initiated. While the valve 41 remains closed, there is no risk of premature or untimely engagement, even when the speed of the driving shaft M is high. In fact, as the disengaged disc 22 does not rotate at the speed of the turbine T, the pressure drop, when moving closer to the shaft, is less rapid in the chamber 14b than in the chamber 14a, which produces an action favorable to the disengagement which becomes more accentuated as the speed of the engine increases.

When the valve 41 is open, there is a large flow through the orifices 38, which play the part of active pressure-drop means. The pressure at the periphery is greater in 14a than in 14b. The difference of pressure is maintained on approaching the shaft and even increases. The disc 22 is therefore engaged.

Reference will now be made to the diagram of FIG. 3, which relates to an alternative form of the arrangement of FIG. 2, in accordance with which means are provided for preventing the leakages along the path 39 at low engine speeds with the valve 41 closed, from rising to an excessive relative value capable of causing defective operation, and in order to ensure on the contrary that the pressures in the two chambers remain definitely different from each other in the manner provided for, with a margin of safety such that the disc 22 remains truly disengaged when the valve 41 is closed, irrespective of the speed of the engine, even when this is low.

In FIG. 3, there are again shown the circuits 30–35 and 38–39 of the clutch-converter. The valve 41, which is in this case formed by a distributor 41', comprises a plunger 42 movably mounted between a withdrawn position (shown in full lines) for the disengagement of the disc 22, and a pushed-in position (shown in dotted lines) for the engagement of the disc 22. These two positions are exactly defined by a spring-loaded ball 52 and grooves 53. The plunger 42 has a long machined portion 43 such that the conduit 44 leading from the delivery of the pump 31, is always in communication with the conduit 45 coupled to the conduit 30, but is in communication with a conduit 46 only in the disengaged position, that is to say the conduit 46 is isolated from the conduit 44 in the engaged position.

The conduit 46 is provided with a non-return spring-controlled valve 47 which acts so that the oil can pass along the conduit 46 in the direction of arrival from the conduit 44, but is prevented from flowing in the opposite direction. On the downstream side of the valve 47, the conduit 46 communicates with the conduit 40 which is coupled to the passage 39. It can be seen that the conduit 40 is closed at its end by the plunger 42 in the position of disengagement, but is put into communication with the exhaust 48 to the reservoir 37 through the intermediary of a machined portion 49 and of an orifice 50 drilled in the plunger 42 in the position of engagement. In addition, the machined portion 49 co-operates with the conduit 36 which is coupled to the passage 35 and which is provided with a diaphragm 51. The conduit 36 communicates with the exhaust 48 in the position of disengagement, and is closed in the position of engagement. A diaphragm 45a may be provided in the conduit 45 in order to accentuate the disengagement action at low speeds.

The operation can be deduced from FIG. 3, and is similar to that which has been previously described. In the position of disengagement shown in full lines, the pressure delivered by the pump 31 is admitted in this case through the medium of the valve 47 and the conduit 40 towards the chamber 14b, thus ensuring the disengagement of the disc 22 positively and without risk, even at low engine speeds.

It will be noted that the oil circulation is then accentuated in the converter, thereby assisting the cooling. The valve 47 prevents any return of oil towards the pump 31, while the pressure at 40 tends to increase as a result of an increase in the speed of the engine.

Figure 4:
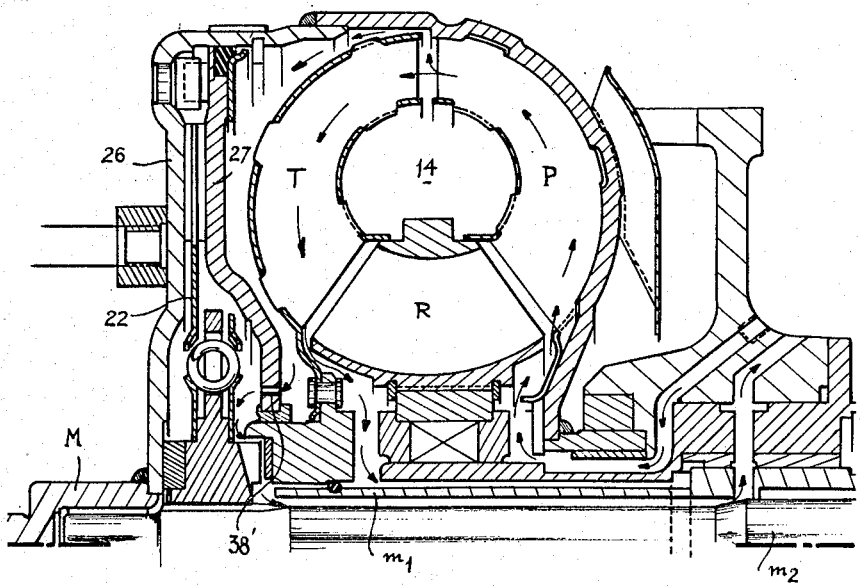
FIG. 4 is a view of a partial modification of the device of FIG. 1, in which the friction disc is capable of rotating faster than the plates, the communication orifices of the moving plate being then provided in the vicinity of the shaft.

Reference will now be made to FIG. 4, in which the device is similar to that shown in FIG. 1, and in which the same reference numbers have been adopted to represent similar members. In the device of FIG. 4, contrary to the arrangement of that of FIG. 1, the transmission is assumed of any type such that in the disengaged position of the disc 22, the turbine T can rotate at a speed lower than that of the disc 22. In other words, disc 22 can overrun turbine T, this latter rotating in the same or in the reverse direction of disc 22. The speed of turbine T in the reverse direction can be higher than the speed of disc 22. In this case, the orifices 38 are provided, not at the periphery of the plate 27, as shown in FIG. 1, but at 38' in the vicinity of the centre of the said plate. The appropriate conditions of operation are thus re-established in a manner similar to that which has been previously described with reference to FIG. 1.

What I claim is:

1. In a power transmission comprising a drive shaft, a hydraulic coupling having an impeller wheel coupled with said drive shaft and a turbine wheel hydraulically driven by said impeller wheel, a clutch having an axially fixed cylinder, an axially movable piston, said cylinder and piston including plate portions, and a driven friction disc between said plate portions to be engaged thereby, said piston defining within said cylinder a clutch chamber containing said friction disc, and a pressure chamber separated from said clutch chamber by said piston, a fluid control circuit comprising said chambers, a small opening through one of said plate portions for interconnecting said chambers, fluid pressure means feeding said pressure chamber for circulating fluid from the pressure chamber through said small opening to the clutch chamber, a return conduit means connected with said clutch chamber, and a valve means in said return conduit means for controlling the fluid flow in the circuit and thereby the pressure drop through said small opening in order to selectively engage and disengage said clutch.

2. A fluid control circuit as defined in claim 1 wherein said hydraulic coupling has a fluid inlet fed by said fluid pressure means and a fluid outlet draining said pressure chamber.

3. A fluid control circuit as defined in claim 2 having a second fluid outlet and second fluid return means connected with said second fluid outlet.

4. A fluid control circuit as defined in claim 2 wherein said hydraulic coupling has furthermore a reactor wheel and said fluid inlet is formed between said reactor wheel and the impeller wheel while said fluid outlet is formed between said impeller wheel and the turbine wheel.

5. A fluid control circuit as defined in claim 1 wherein said cylinder and said piston are rigid in rotation with said impeller wheel.

6. A fluid control circuit as defined in claim 1, said small opening being formed in the vicinity of the periphery of the clutch.

7. A fluid control circuit as defined in claim 1, said small opening being formed in the vicinity of the clutch axis.

8. A fluid control circuit as defined in claim 1 further comprising spring means urging said piston for disengaging said clutch.

References Cited by the Examiner

UNITED STATES PATENTS

| 2,793,726 | 5/57 | Jandasek | 192—3.2 |
| 2,841,262 | 7/58 | Zeidler | 192—3.2 X |
| 2,950,630 | 8/60 | Zeidler | 192—3.2 X |

DAVID J. WILLIAMOWSKY, *Primary Examiner.*

THOMAS J. HICKEY, *Examiner.*